United States Patent [19]

Häfele et al.

[11] Patent Number: 4,938,120
[45] Date of Patent: Jul. 3, 1990

[54] DEVICE FOR INFLUENCING THE RESET VALUE OF A VALVE

[75] Inventors: Carl H. Häfele; Manfred Weyand, Korschenbroich, Fed. Rep. of Germany

[73] Assignee: Sempell Aktiengesellschaft, Fed. Rep. of Germany; a part interest

[21] Appl. No.: 366,491

[22] Filed: Jun. 15, 1989

Related U.S. Application Data

[63] Continuation of Ser. No. 243,717, Sep. 13, 1988, abandoned.

[30] Foreign Application Priority Data

Sep. 20, 1987 [DE] Fed. Rep. of Germany ....... 3731661

[51] Int. Cl.⁵ .................. F15B 15/26; F15B 21/10; F16K 31/08
[52] U.S. Cl. .................................... 92/16; 92/25; 251/75; 251/65; 251/58
[58] Field of Search ............... 92/25, 16, 118; 251/75, 251/58, 65

[56] References Cited

U.S. PATENT DOCUMENTS

| 1,832,090 | 11/1931 | Branche | 251/58 X |
| 2,996,071 | 8/1961 | Takaoka | 251/75 X |
| 3,566,912 | 3/1971 | Dunkelis | |
| 3,665,958 | 5/1972 | Dunkelis | |
| 3,677,290 | 7/1972 | Giesecke | |
| 4,600,034 | 7/1986 | Ko | 251/65 X |

FOREIGN PATENT DOCUMENTS

| A10080107 | 6/1983 | European Pat. Off. |
| 533169 | 2/1941 | United Kingdom |
| 706770 | 4/1954 | United Kingdom |
| 908916 | 10/1962 | United Kingdom |
| 957886 | 5/1964 | United Kingdom |
| 1203413 | 8/1970 | United Kingdom |
| 1593871 | 7/1981 | United Kingdom |
| 1602306 | 11/1981 | United Kingdom |

Primary Examiner—Arnold Rosenthal
Attorney, Agent, or Firm—Fred Philpitt

[57] ABSTRACT

The ON behavior of a pressure switch or a valve (134) differs from its reset behavior by virtue of the fact that the movable pressurized part (126) is connected to one of the parts of a magnet assembly (112, 114) which are movable in relation to one another.

3 Claims, 4 Drawing Sheets

DEVICE FOR INFLUENCING THE RESET VALUE OF A VALVE

This is a continuation of application Ser. No. 243,717, filed Sept. 13, 1988, now abandoned and the benefits of 35 USC 120 are claimed relative to it.

DESCRIPTION

The invention relates to a device for influencing the reset level of a valve or a pressure switch.

Valves or pressure switches of this type have a movable part which is subjected to the pressure in a line or vessel that is to be monitored. The reaction thresholds of the valve or pressure switch are normally predetermined by the stiffness of a spring which pretensions the movable part towards a stop against the application of pressure. By adjusting the pretensioning of the spring it is possible to adjust the reset level, that is to say the pressure level at which the movable part of the valve or pressure switch begins to return towards the rest position predetermined by the spring's pretensioning. However, such adjustment to the pretensioning of the spring will simultaneously also alter the level at which the valve or pressure switch cuts in or opens.

For many applications, e.g. safety valves and pressure-operated switches in safety devices, it would be desirable for the level at which the valve or pressure switch opens to differ from the level at which it is reset, and in particular for the opening level to be higher than the reset level, and for said levels to be independently adjustable.

To achieve this object the invention provides a reset level influencing device as described hereinafter.

The reason why the influencing device according to the invention has a switching level which varies in the opening and closure directions is that the force exerted by the parts of the magnetic assembly upon one another falls off very rapidly as the distance between said parts increases. Thus for small distances between the movable valve part or movable switch part and its rest position there is a strong magnetic force which is in addition to the force of the pretensioning spring; however, when the movable part comes to make large excursions from its rest position the magnetic force has fallen steeply, and the force counteracting the pressure applied is due in vary large part to the pretensioning spring.

It will be obvious that the magnet assembly can be spatially provided so as to become active in the vicinity of the rest position, or else so as to become active in the vicinity of the operational position. In addition, the magnet assembly can be selected so that its cooperating parts produce a force of attraction, or alternatively so that they repel each other. Depending on the specific selected polarity of the magnets and on their spatial arrangement, the reset level can thus be selected to be lower or higher than the ON level. This modification is achieved with little additional constructional outlay and hence at low additional cost.

The effect achieved by the refinement of the invention according to another embodiment is that the two parts of the magnet assembly cannot "stick" together when the movable part of the valve or pressure switch is moved against a stop to its rest position.

The refinement of the invention according to another embodiment means an even faster change in the auxiliary magnetic force as the movable valve part or movable switch part follows its path.

The refinement of the invention according to another embodiment has an advantage in respect of operational safety in the event of a power failure and in respect of low energy costs.

The refinement of the invention according to another embodiment has an advantage in respect of the fact that very high auxiliary forces are exerted and also in respect of applications where strong magnetic fields cannot be tolerated.

The refinement according to another embodiment enables the contribution of the various forces to be readily varied by altering the lever arms beneath which they act.

According to other embodiments it is additionally possible to adjust the auxiliary magnetic force, and to adjust the auxiliary force provided by a spring.

In the device according to another embodiment, the parts of the magnet assembly cannot adhere together magnetically. As a rule the spacer plate need only be about 0.5 mm thick, which still ensures that small changes in distance produce a large change in the auxiliary magnetic force.

The invention will now be described in more detail with the aid of embodiments and with reference to the drawing, wherein.

Figure 1:
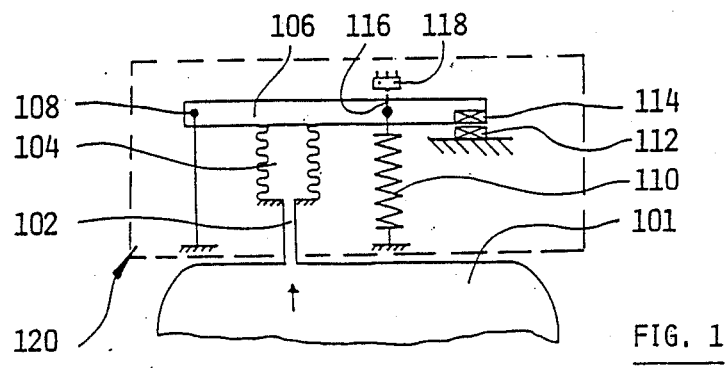
FIG. 1 shows a schematic representation of a pressure switch on a pressure vessel, where said switch has a reset level different from the ON level.

In FIG. 1 a pressure vessel is designated overall as 101. The interior of a bellows 104 is connected to pressure vessel 101 via a sensing line 102.

One end of the bellows 104 is stably supported in three dimensions; the movable end of said bellows acts on a lever 106 which is stably mounted in three dimensions at 108.

A tension spring 110 further acts on lever 106. The other end of said spring is fixed.

The free end of lever 106 carries a permanent magnet 112, which cooperates with a second permanent magnet 114 stably mounted in three dimensions.

The top surface of lever 106 carries a cam 116, which cooperates with a microswitch 118.

If the pressure in pressure vessel 101 is below a preset level, lever 106 is pulled downwards in FIG. 1 with an overall force greater than the upwardly directed force obtained by applying pressure to bellows 104. The force opposing the application of pressure is made up of the force of tension spring 110 and the force of permanent magnet assembly 112, 114.

If the pressure in pressure vessel 101 rises so sharply that the force obtained by the application of pressure is slightly greater than the force of tension spring 110 and permanent magnet assembly 112, 114, lever 106 then swivels in an anti-clockwise direction. Upon this swivel movement the force generated by tension spring 110 increases due to the elongation of said spring; on the other hand, the force of permanent magnet assembly 112, 114 falls very sharply, lowering the overall resetting force. This produces a clear and rapid upward movement overall by the lever 106, with the result that cam 116 for example actuates microswitch 118.

Conversely, microswitch 118 is cleared again using a smaller pressure than the pressure needed to actuate microswitch 118, for when microswitch 118 is actuated, the permanent magnets 112, 114 are farther apart from one another than in the rest position shown in FIG. 1, and hence the forces operating overall to close the switch are smaller.

Parts 104 to 118 thus together form a pressure switch 120 with OFF behaviour that differs from the ON behaviour.

Figure 2:
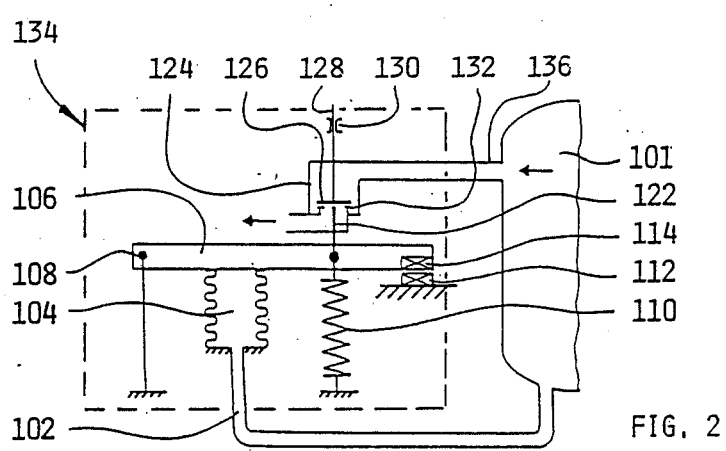
FIG. 2 shows a schematic representation of a safety valve on a pressure vessel, where said valve has a closure level different from the opening level.

In FIG. 2 parts which correspond in function to parts already discussed with reference to FIG. 1 have again been labelled with the same reference numerals. It is not necessary to describe these parts again in detail.

Lever 106 now operates on a valve lifter 122, which passes snugly through a bottom wall of a valve casing 124 and is able to act on the lower surface of a closure member 126. The latter sits on a valve spindle 128, the guide for which is indicated schematically at 130. Closure member 126 cooperates with a valve seat 132 formed in valve casing 124, and the valve formed by the foregoing parts and designated overall by 134 is inserted into a discharge line 136 which communicates with pressure vessel 101.

The arrangement of permanent magnets 112, 114 at the free end of lever 106 causes closure member 126 to open with a jerk at valve 134 once a preset opening pressure is exceeded. Because the force obtained between permanent magnets 112 and 114 depends heavily on the distance between these two, the closing behaviour obtained at valve 134 also differs from the opening behaviour.

Figure 3:
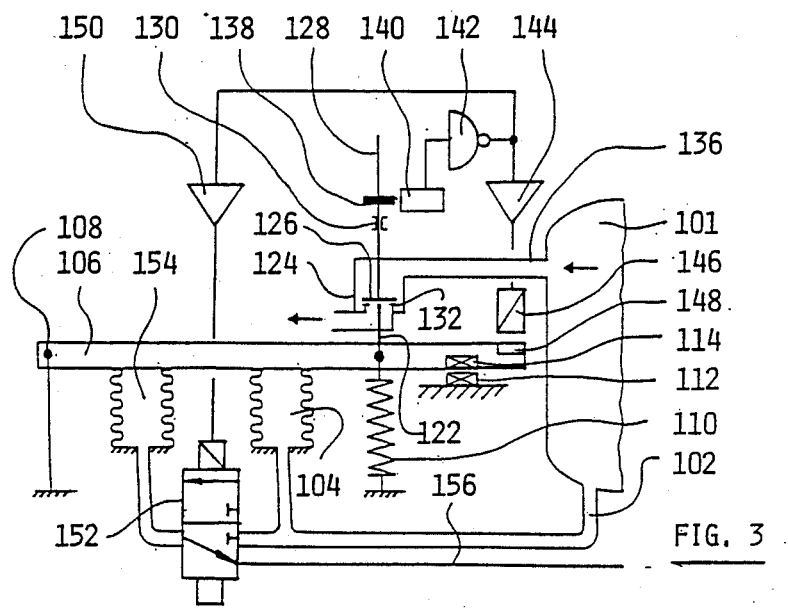
FIG. 3 shows a similar safety valve as in FIG. 2 with additional devices for producing an auxiliary force that depends heavily on the path of the movable valve part.

In the further modified embodiment shown in FIG. 3, parts already shown in FIG. 2 are again labelled with the same reference numerals.

Valve spindle 128 carries a metallic sensing plate 38, which cooperates with an inductive pick-up 140. The output signal from pick-up 140 is converted by an inverter 142 into an input signal for a power amplifier 144. The output of said amplifier is linked to a solenoid 146, which cooperates with a retaining plate 148 additionally provided at the free end of lever 106. In the embodiment under consideration, solenoid 146 is arranged above retaining plate 148, with the result that when sensing plate 138 has moved upwards away from pick-up 140 an additional force is obtained which operates in the direction in which the valve opens.

The output signal from inverter 142 is at the same time used to activate a further power amplifier 150, the output signal from which is used to actuate a solenoid valve 152. This solenoid valve 152 is pretensioned by a spring to the rest position represented in the drawing, in which a further bellows 154, engaging at lever 106 in the same direction as bellows 104, is connected to a discharge line 156. Conversely, when solenoid valve 152 is excited, the pressure inside pressure vessel 101 is likewise applied to the interior of bellows 154, with the result that when sensing plate 138 moves upwards away from pick-up 140 a powerful auxiliary force is again obtained which acts in the direction in which the valve opens.

It will be obvious that the various devices shown in FIG. 3 may also be used separately or in subcombinations to generate an auxiliary force in addition to the force of tension spring 110.

Figure 4:
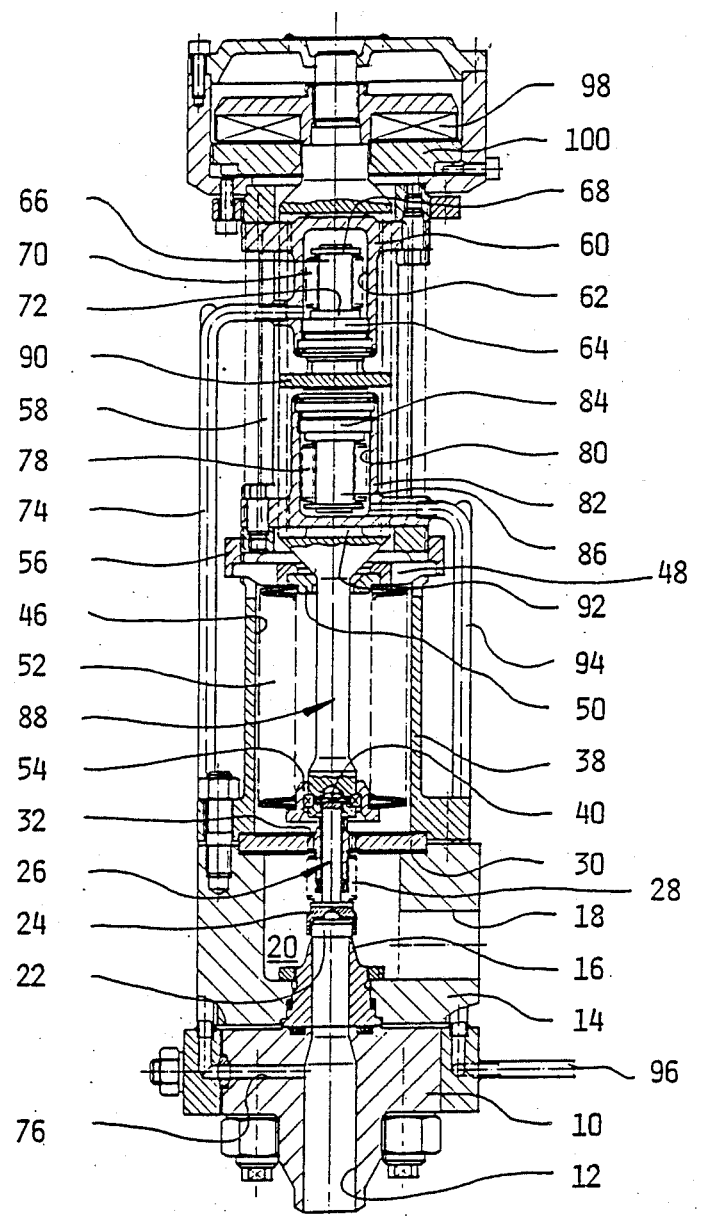
FIG. 4 shows an axial section through one practical embodiment of a servo-valve with different opening and closure behaviour.

The servo-valve shown in FIG. 4 has a bottom cover 10, in which there is provided an inlet 12. The bottom wall of a lower casing portion 14 incorporates a valve seat 16, which communicates with inlet 12. In the periphery wall of casing portion 14 there is provided an outlet 18, which communicates with an annular outlet compartment 20 surrounding valve seat 16.

A closure member 22 cooperates with valve seat 16. Said closure member is held so as to be slightly tiltable in a lower head section 24 of a valve spindle designated overall by 26.

Valve spindle 26 is sealed by a metal sealing bellows 28 from an intermediate plate 30, which closes off the top surface of outlet compartment 20. Intermediate plate 30 has in its central area a plurality of bores 32, which communicate with the interior of sealing bellows 28.

A middle casing portion 38 is positioned on lower casing portion 14, and a coupling piece 40 can be accessed through the lateral openings in said middle casing portion. Said coupling piece connects valve spindle 26 with a drive spindle 88. Middle casing portion 38 delimits a spring chamber 46, sealed off by a chamber cover 48. The top end of a disk spring assembly 52 is supported on the lower surface of chamber cover 48, and the bottom end of said spring assembly acts on a spring seat 54 fixedly connected to drive spindle 88. In this manner closure member 22 is pretensioned to the closing position.

Chamber cover 48 is secured by means of a ring 56 to the bottom flange of a top lantern-shaped casing portion 58. A motor casing 60 is screwed onto the upper extreme portion of casing portion 58, and in said motor casing there is a downwardly open cylindrical pressure chamber 62. A cylindrical end piece 64 is snugly and sealingly inserted into the bottom end of pressure chamber 62. Said end piece has a central pilot hole through which an end portion 66 of drive spindle 88 extends. At its free end this end portion 66 carries a moulded on flange 68, on which the top end of a metal bellows 70 is secured in flowant-impervious manner. The bottom end of the metal bellows 70 is connected tightly to a shoulder 72 of end piece 64.

Pressure chamber 62 communicates via a condensate spiral 74, which extends in a plurality of turns along the shell surface of the valve casing, with a take-off port 76 formed in the bottom cover 10 of the valve casing and running from inlet 12. By means the pressure prevailing in inlet 12 is applied to pressure chamber 62 via a liquid column.

To control closure member 22, a second pressure medium-actuated motor is provided which incorporates a second metal bellows 78. The latter is located in a further pressure chamber 80, formed in a second motor casing 82. Motor casing 82 is connected to the bottom end wall of lantern-shaped casing portion 58.

Pressure chamber 80 of motor casing 82 is sealed off by a superjacent end piece 84. A further rod-shaped end portion 86 of drive spindle 88 passes in a sliding fit through said end piece 84. Both end portions 66 and 86 are carried by a bridge 90, which is rigidly welded to a cage portion 92 of drive spindle 88. Cage portion 92 of drive spindle 88 surrounds motor casings 60 and 82 with radial clearance and at the same time enables pressure medium to be supplied to the two pressure chambers 62 and 80 respectively via condensate spiral 74 and a second condensate spiral 94, which is connected via a line 96 and a control valve (not shown) to a source of actuating pressure.

The top end of drive spindle 88 carries a permanent magnet 98, which cooperates with a fixed retaining plate 100. By this means a pretensioning force in the direction of closure is obtained which falls off sharply with the lift of stroke of closure member 22. Such a system is prior art in full-stroke safety valves.

The cross-sectional area of the metal bellows 70 is adapted to the annular surface defined by valve seat 16, with the result that the upper bellows motor compensates the pressure applied to closure member 22.

Geometric factors determine that the cross-sectional area of the second metal bellows 78 is made only slightly larger than the cross-sectional area of metal bellows 70, since both motor casings 60 and 82 are to be accommodated inside cage section 92 of drive spindle 88.

As can be seen from FIG. 4, there is a small gap between the lower end face of permanent magnet 98 and the upper surface of retaining plate 100 when closure member 22 is resting on valve face 16. This prevents permanent magnet 98 from sticking on retaining plate 100.

The valve shown in FIG. 4 is characterised by its very compact construction. It contains a device for compensating the pressure applied to closure member 22, magnet assembly 98, 100 for producing a heavily path-dependent auxiliary force on drive spindle 88, and the second bellows motor 78 to 82 for producing a further auxiliary force, whereby it is possible to control the application of pressure to line 96 in similar path dependent manner to the application of pressure to bellows 154 shown in FIG. 3.

Figure 5:
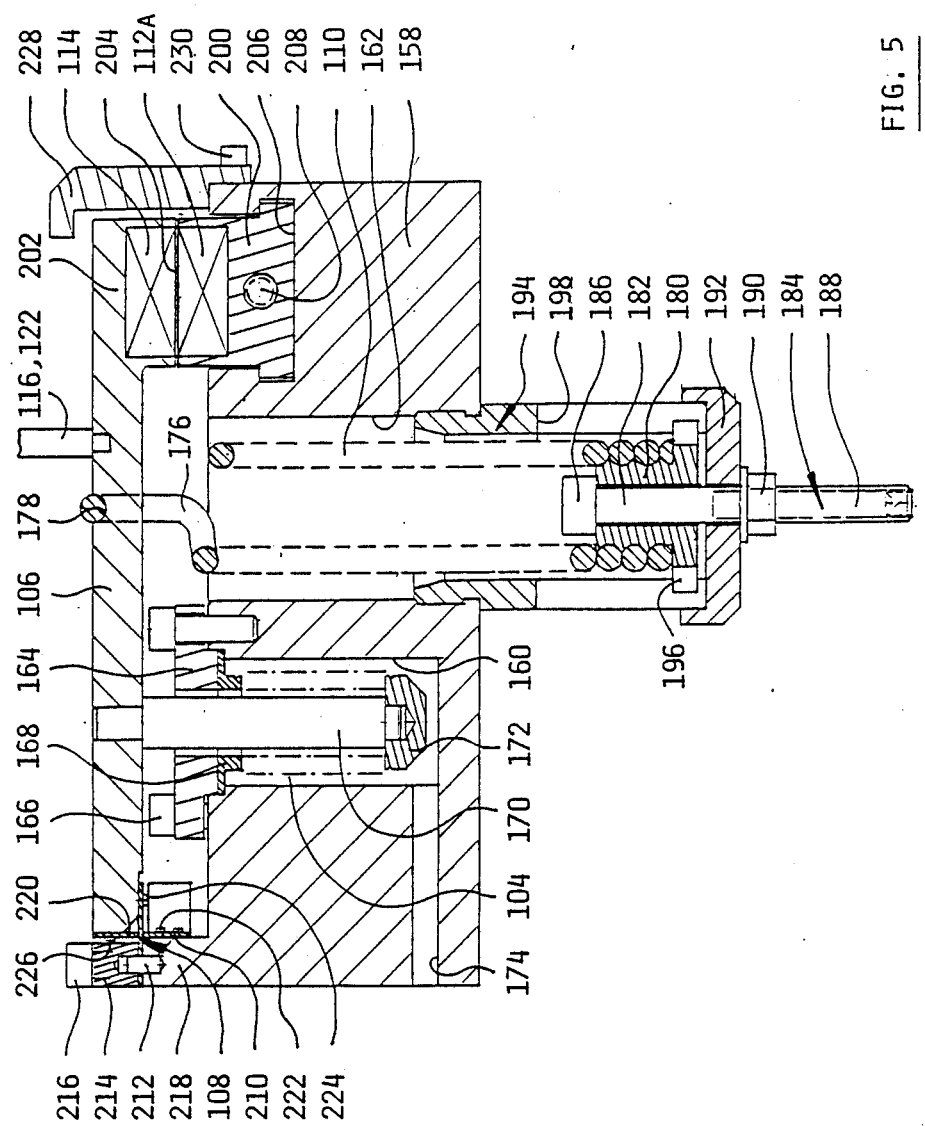
FIG. 5 shows a section through a modified device for influencing the reset level of a valve or pressure switch.
Figure 6:
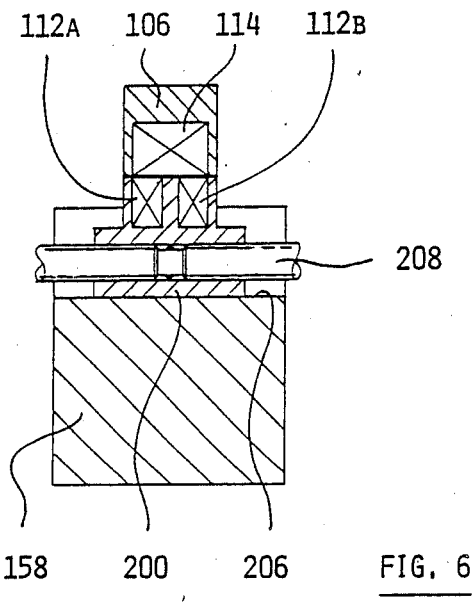
FIG. 6 shows a transverse section through the device of FIG. 5, viewed at the level of the magnet assembly.

FIGS. 5 and 6 respectively show one concrete embodiment of the operating device for microswitch 118 of pressure switch 120 shown in FIG. 1, and valve lifter 122 of the valve shown in FIG. 3. The operating device for valve lifter 122 in the valve according to FIG. 3 can be derived from the embodiment according to FIGS. 5 and 6 by expanding it by a further metal bellows in the same way. In these Figures, components already detailed above with reference to FIGS. 1 and 2 are again labelled with the same reference numerals.

A three dimensionally stably arranged base block 158 is connected to a bellows chamber 160 and to a spring chamber 162, both of which are aligned perpendicular to the axis of lever 106.

A cover 164 is clamped securely by screws 166 to the upper surface of base block 158, and a supporting flange 168, on which bellows 104 rests, is interposed therebetween.

A tension and pressure transmitting rod 170 extends with radial clearance through cover 164 and supporting flange 168, leading to a bellows headpiece 172. The bellows end lying at the bottom in FIG. 5 is firmly fixed to said bellows headpiece.

As can be seen from the foregoing description, bellows chamber 160 is thus sealed off from the environment and communicates with a connection channel 174 of base block 158, which is to be connected to sensing line 102. Thus the measurement or actuating pressure is applied to the external surface of bellows 104, while the internal surface of the bellows is relieved from pressure. Tension spring 110 has a top hook-shaped spring end 176, which engages in a groove 178 of lever 106 which is arcuate even when viewed in transverse section. The bottommost turns of tension spring 10 rest positively on a spring seat 180 through which an upper end portion 182 of a holding bolt 184 passes. Said holding bolt has a head 186 which lies above the top end surface of spring seat 180 and a threaded section 188 on which an adjusting nut 190 runs.

Adjusting nut 190 is in turn supported by a spring chamber cover 192 on the bottom end of a lantern part 194 screwed into the bottom end of spring chamber 162.

As can be seen from FIG. 5, spring seat 180 has radially protruding spring seat arms 196, which run in axially slidable manner in axial windows 198 of lantern part 194. It will be recognised that this enables the pretensioning of tension spring 110 to be simply and continuously adjusted.

As can be seen from FIG. 6, the bottom magnet 112 comprises two parts 112a, 112b, which are let into a cradle 200 at a transverse distance apart, based on the axis of lever 106. The top permanent magnet 114 is in one piece and is so let into a head portion 202 of lever 106 that it opposes permanent magnets 112a and 112b a short distance away. In order to prevent the top permanent magnet 114 from sticking on the two bottom permanent magnets 112a and 112b, a non-magnetic spacer plate 204 is firmly attached, e.g. glued, to the bottom of permanent magnet 114 or to the top of permanent magnets 112a and 112b. Said plate may, for example, be made of brass.

Cradle 200 runs in a base block 158 guide 206 extending transversely to the axis of lever 106, and can be finely adjusted in said guide by means of a threaded spindle 208. This enables the overlap between the magnetic fields of the assembly comprising permanent magnets 112a, 112b on the one hand and permanent magnet 114 on the other to be adjusted, and along with it the force exerted between these magnets.

Bearing 108 which carries lever 106 is in the form of a universal spring joint. It incorporates a horizontal articulated disk 210, the left-hand end of which is firmly joined by means of fixing pins 212 and a flat connector block 214 to base block 158. Flat connector block 214 is fixed by screws 216 to the upper surface of base block 158 and has a somewhat smaller width than a mounting fin 218 which projects upwardly from the upper surface of base block 158.

The bottom end of a vertical articulated disk 220 is attached by screws 222 to the inner surface of mounting fin 218.

The free ends of articulated disks 210, 220 are attached by screws 224, 226 to the back end of the lower surface of lever 106 and the back end face of lever 106, respectively. This bearing construction enables lever 106 to be swivelled through small angles with very little friction, in particular without any static friction in the joint. The anti-clockwise swivel path of lever 106 is limited by a corner stop 228, which is attached to the right-hand end face of base block 158 by screws 230.

Figure 7:
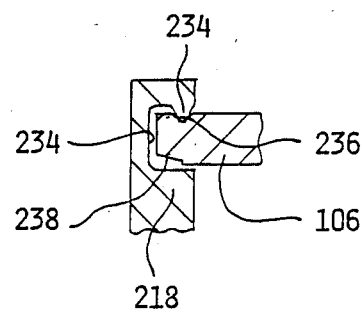
FIG. 7 shows a longitudinal section through a modified lever mounting for the device in FIG. 5.

FIG. 7 shows a modified mounting for lever 106. Mounting fin 218 is provided with a recess 232 whose upper wall as seen in FIG. 7 bears a knife edge 234. This knife edge 234 engages in a bearing slot 236 at the back end of the top surface of lever 106, said bearing slot having a large apex angle. The back end of the lever bottom surface is provided with a chamber 238, and there is little clearance between the bottom surface of the lever and the wall of recess 232 shown at the bottom in FIG. 7, with the result that the left-hand lever end, which under the overall force normally acting on lever 106 is kept in contact with knife edge 234, can be swivelled back through small angles with only slight friction.

In the foregoing embodiments it is assumed that the parts of the permanent magnet assembly that can be moved relative to one another are mutually attractive. These embodiments may also be modified so that mutually repelling magnets are used, so as to otherwise modify the opening and closing behaviour of a valve or the ON and reset levels of a pressure switch. Nor do the magnets need to exert the greatest mutual force when the valve or pressure switch is in one of its end positions; they may also do so within the lift stroke of the movable valve or pressure switch component.

We claim:

1. A fluid operated drive assembly having snap characteristics for operating a closing control mechanism (126, 136, 118) comprising a fluid actuated motor (160 to 172) and biassing spring means (110) as well as magnet assembly (112, 114) including a stationary and a movable part made from magnetic material, driving members of said motor, said spring means and said magnet assembly acting on a lever (106) which in turn is connected to an output member (116) of the drive assembly, comprising abutment means (204) defining a minimum distance between the two parts of the magnet assembly, and comprising adjustment means (208) for varying the relative position between the two parts of the magnet assembly (112, 114) wherein the end faces of the two parts of the magnet assembly (112, 114) are adapted to be moved into a position of mutual surface contact thus forming said abutment means and wherein the adjustment means (208) act on one (112) of the parts of the magnet assembly (112, 114) for moving the latter in a direction that is perpendicular to the pivoting plane of the lever (106).

2. A drive assembly as set forth in claim 1 wherein the part (112) of the magnet assembly (112, 114) is arranged for movement in a direction perpendicular to the pivoting plane of the lever (106) and is arranged on a carriage (200) co-operating with guide means (206) of a stationary base member (158), and said adjustment means is formed by a finely threaded spindle (208).

3. A drive assembly as set forth in claim 1 wherein a spacer plate (204) made from non-magnetic material is arranged on the end face of one (112) of the co-operating parts of the magnet assembly (112, 114).

* * * * *